United States Patent [19]

Raines

[11] 4,287,065

[45] Sep. 1, 1981

[54] FILTER HUB ASSEMBLY

[75] Inventor: Kenneth Raines, Bethlehem, Pa.

[73] Assignee: Burron Medical Inc., Bethlehem, Pa.

[21] Appl. No.: 89,368

[22] Filed: Oct. 30, 1979

[51] Int. Cl.[3] .............................................. B01D 29/00
[52] U.S. Cl. .................................... 210/445; 210/446
[58] Field of Search .................. 128/214 R; 156/73.1, 156/580.1; 210/445, 446, 451, 453, 927

[56] References Cited

U.S. PATENT DOCUMENTS 3,722,697  3/1973  Burke et al. .......................... 210/451
3,954,625  5/1976  Michalski .............................. 210/451

Primary Examiner—Ivars C. Cintins
Attorney, Agent, or Firm—Shoemaker and Mattare, Ltd.

[57] ABSTRACT

A filter hub assembly has a male portion which serves as a needle accommodating unit ultrasonically welded to a female portion with a filter interpositioned therebetween. The needle accommodating unit has a sealing shoulder thereon and a lowermost rim which is inwardly beveled to contact a filter in a gentle yet secure manner.

2 Claims, 5 Drawing Figures

FILTER HUB ASSEMBLY

BACKGROUND OF THE INVENTION

The present invention relates in general to needles, and, more particularly, to needles wherein fluid is filtered as that fluid moves through the needle.

Needles are known in the prior art. Examples of such needles are disclosed in U.S. Pat. Nos. 3,935,111, 3,722,697, 4,014,797, 4,148,732 and 4,159,954. Pharmacists often use syringes in a reconstitution procedure wherein diluent is injected from a syringe into a vial containing a drug, the drug is reconstituted, then the reconstituted drug is withdrawn from the vial.

Because of the structure of the known devices, reconstitution procedures using known devices are costly and time consuming due to the presence of non-reconstituted drug.

SUMMARY OF THE INVENTION

The device embodying the teachings of the present invention can be used to aspirate and reconstitute a drug, as well as filter fluid passing therethrough.

The device includes a male filter hub unit which serves as a needle accommodating unit welded to a female filter hub unit with a filter interpositioned therebetween. The needle accommodating unit includes a sealing shoulder and an energy director and has a bore defined therein into which a portion of a needle is fit to hold that needle on the unit.

Application of energy, either sonic or ultrasonic, as suitable, to the assembly causes the energy director to melt to form shear joints and weld the needle accommodating unit to the female filter hub unit.

A filter is located between the needle accommodating unit and the female filter hub unit and is located so that all fluid passing through the assembly passes through the filter to be filtered thereby.

It is noted that the filter prevents any lumps of material from passing therethrough. Thus, in a reconstitution step, some of the drug may not be fully dissolved and may thus form clumps. Such clumps are prevented from passing from the vial by the filter, and thus the drug dispensed by the device of the present invention is very homogenous.

A sealing shoulder on the needle accommodating unit acts as a gauge to insure proper insertion of the needle into a vial, or other such container.

OBJECTS OF THE INVENTION

It is a main object of the present invention to permit a user to filter all fluid passing through a device which can be used in a reconstitution and/or aspiration procedure.

This together with other objects and advantages which will become subsequently apparent resides in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
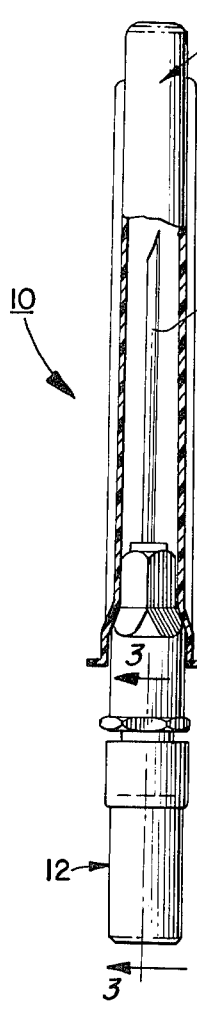
FIG. 1 is an elevation view of the device embodying the teachings of the present invention.
Figure 3:
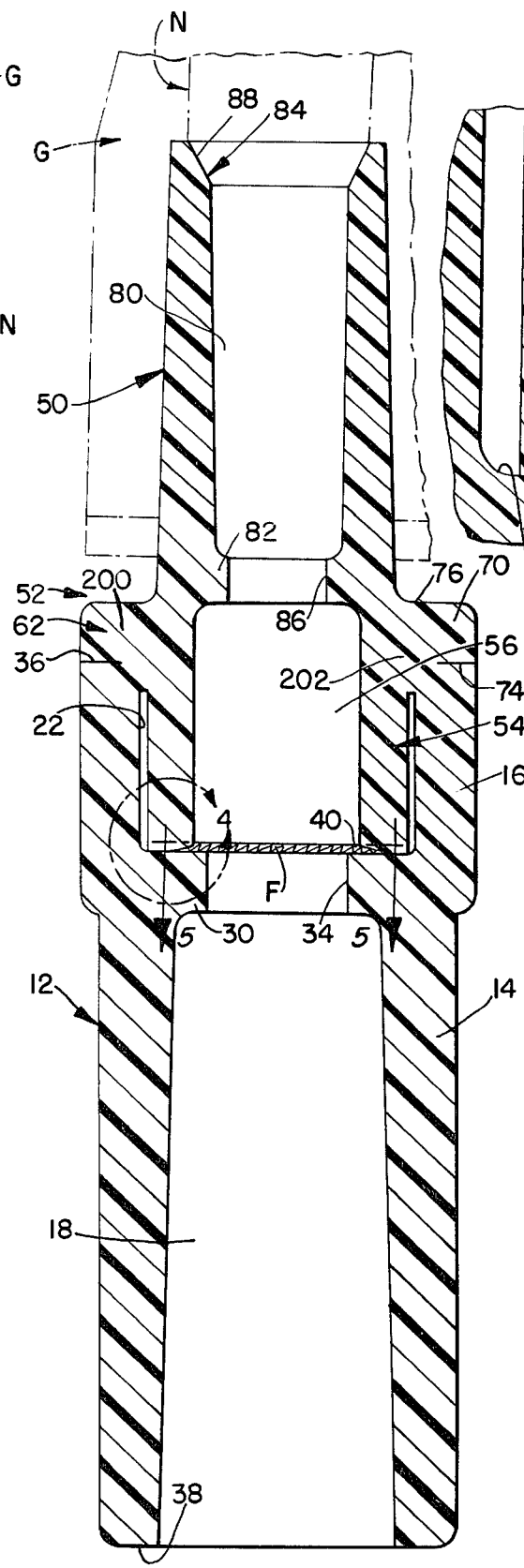
FIG. 3 is an elevation view of the device embodying the teachings of the present invention after the aforementioned welding step.
Figure 4:
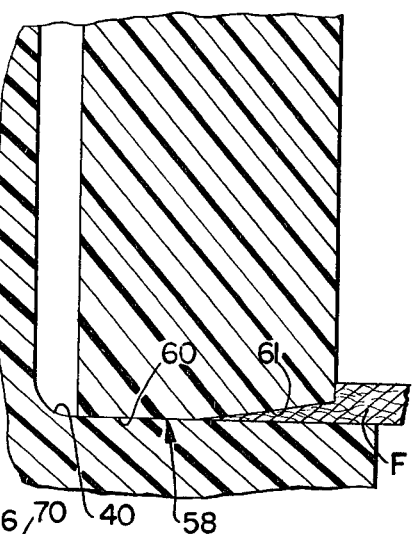
FIG. 4 is a section of FIG. 3 as indicated by the line 3 in that FIG.
Figure 5:
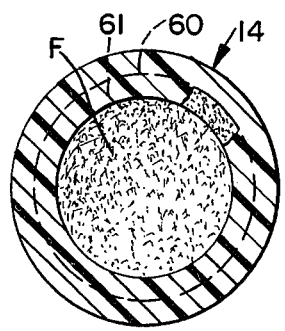
FIG. 5 is a view taken along line 5—5 of FIG. 3.
Figure 2:
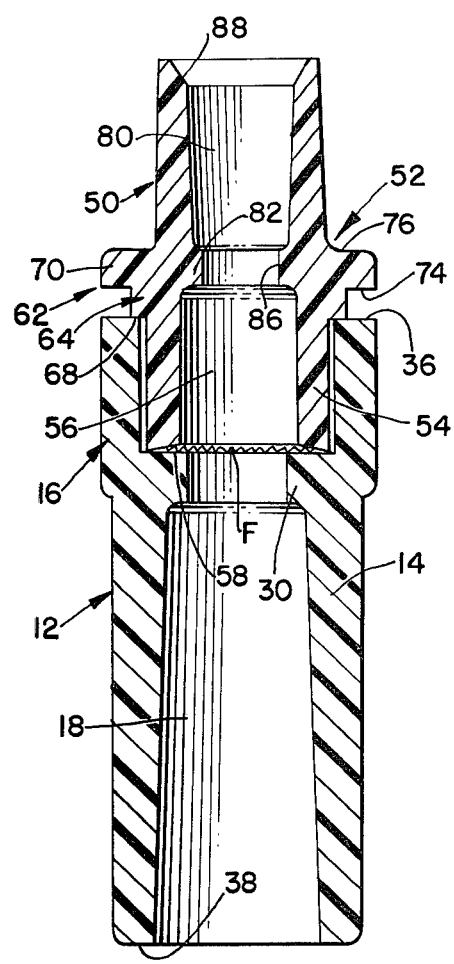
FIG. 2 is an elevation view of the device embodying the teachings of the present invention prior to a welding step wherein a needle unit is welded to a filter hub unit.

Shown in FIG. 1 is an assembly 10 which can be used in conjunction with a needle N and a syringe for aspiration, of for dispensing, or the like. A guard G covers the needle to maintain sterile conditions for that needle. As shown in FIGS. 1-3, the assembly 10 includes a female hub unit 12 having a cylindrical body 14 with a coupling sleeve 16 on one end thereof and a lure taper or bore 18 defined longitudinally therethrough. The coupling sleeve is cylindrical and extends radially outwardly of the body and has a bore 22 defined longitudinally thereof. The bore 18 is longitudinally tapered toward the sleeve, and the bore 22 is essentially cylindrical and has an inner diameter larger than the uppermost end of the bore 18. A shoulder 30 separates the two bores 18 and 22 and has an opening 34 defined therethrough to place the bores 18 and 22 in fluid communication with each other. The adaptor 12 has a first rim 36 and a second rim 38.

The shoulder 30 forms a filter retainer, and a filter F is mounted on the upper surface 40 of the filter retainer. The filter F is clamped in the position shown in FIGS. 2 and 3, and will be discussed below. Thus, fluid passing through the bores 18 and 22 and the opening 34 will also pass through the filter F, and be appropriately filtered.

A male filter hub unit serves as a needle accommodating unit 50 and is engaged with the female filter hub 12. The needle unit 50 includes a lower section 52 having an annular base 54 on one end thereof. The base 54 is essentially cylindrical and has a bore 56 defined longitudinally therein. The outer diameter of the base 54 is slightly less than the inner diameter of the bore 22 so the base 54 can be positioned and seated in the coupling bore 22 as will be discussed below. The base 54 has a rim 58 which is inwardly beveled and which seats on the filter F in the assembled configuration. Preferably, the rim 58 has an 8° inward taper and has a lowermost portion 60 thereon.

The rim 58 is best shown in FIG. 3 and includes the lowermost portion 60 which is generally horizontally disposed, and beveled portion 61 which tapers from the portion 60 toward the other end of the unit 50 to define an inwardly concave beveled portion. The function of this rim will be discussed below.

A shoulder portion 62 is located on the base 54 and includes a stepped portion 64 which extends radially outwardly from the base 54 and has a surface 68 which abuts the first rim 36 in the FIG. 2 orientation. The stepped portion acts as an energy director and melts upon the application of ultrasonic or sonic energy to sealingly connect the needle accommodating unit to the female filter hub unit. A sealing shoulder 70 extends radially outward of the stepped portion 64 and has an abutment surface 74 and a rear surface 76 thereon. In the assembled FIG. 3 configuration, the rear surface 76 abuts the rim of the female filter hub unit. The sealing shoulder, the shoulder portion and the base all define a stepped configuration on one end of the lower section 52.

A bore 80 is defined longitudinally through the adaptor section and has an inner diameter slightly less than the inner diameter of the bore 56 but is axially aligned therewith. A shoulder section 82 is formed between the two bores 56 and 80 and these bores are in fluid communication with each other and with the bore 34 via filter F in the assembled configuration of the needle assembly 10. The bore 80 has an end 84 defined at the end thereof remote from the bore 56, and is tapered inwardly toward the shoulder section 82. A port 86 is defined in the shoulder section to fluidly connect the bores 56 and 80.

An inwardly tapering counterbore 88 is on the needle accommodating unit at the end therefore which is remote from the lower section 52. The needle N is accommodated in the bore 80 and the counterbore 88 as indicated in FIGS. 2 and 3 in phantom lines.

To form the assembly 10, the needle accommodating unit 50 is first seated in the female filter hub unit as indicated in FIG. 2 with the filter F interpositioned therebetween as shown in that figure. Preferably, ultrasonic energy is applied to the assembly and the energy director stepped portion 64 melts and permits fixed seating of the needle accommodating unit 50 in the coupling sleeve 16 with ultrasonic shear joints 200 and 202 joining the needle unit to the filter hub. The shear joints sealingly connect these two elements and thus block any fluid path between the filter F and the exterior of the assembly 10. The shear joints form an excellent high pressure seal, and further prevent wicking of the filter. Thus, fluid passing through the filter will not exit the assembly due to the joints, and further, because these joints are above the filter, no fluid will seep through the filter to the exterior of the assembly, and hence the joints prevent wicking of the filter.

The portion 60 of the beveled rim forms a clamp and gently, but firmly, holds the filter in the desired position. It is noted that if the filter is made of an acrylic-like weave, it could be welded in place during the ultrasonic welding step. However, if the filter is a nylon material, that filter is clamped in place. There will be some melting of the portion 60 even for this latter situation, however.

Preferably, the filter F is a 5 micron particulate matter filter, and can be a screen-type filter, which is comprised of woven nylon monofilament, or a membrane type filter which is comprised of an acrylic copolymer sheet with nylon support. The needle accommodating unit 50 and the filter hub unit 12 are preferably injection molded. If the filter F is a membrane filter, the beveled nature of the rim 58 becomes important. By "membrane filter", it is meant a filter of the type discussed above having a nylon superstructure with a plastic coating. Such filters are, for practical purposes, fragile and thus can be broken during a clamping procedure. The angle of the beveled rim 58, preferably 8°, permits the filter to be sealed about the periphery thereof as the needle unit moves toward the bore 22 of the coupling sleeve. As the needle unit comes down into this bore, the portion 61 contacts the outer periphery of the membrane filter, and gently clamps that filter at an angle so there is no sudden reduction in filter thickness. A sudden reduction in filter thickness could crack a membrane filter. Thus, the membrane filter, like the other above-discussed filters, is clamped, but by virtue of the bevel of rim 58, that membrane filter is clamped in a manner such that there is a gradual reduction in membrane thickness and not a sudden redution in membrane thickness.

The filter F blocks any material that is not in a proper fluid suspension from passing the filter location. Thus, any drug which has not been fully dissolved will not pass back into the syringe after a reconstituting step.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A filter hub assembly for use in drug reconstitution procedures comprising:

an elongate female filter hub having a coupling sleeve on one end thereof, a fluid passage defined longitudinally therethrough and an annular support shoulder at one end of said hub, said support shoulder having a fluid passage defined therethrough to be in fluid communication with said filter hub fluid passage;

an elongate male needle accommodating unit having a base on one end thereof and a fluid passage defined longitudinally therethrough, said needle accommodating unit fluid passage being sized and adapted to mount a needle therein, said needle accommodating unit including an energy director element and a sealing shoulder on said base, said base being accommodated in said coupling sleeve and ultrasonically welded thereto with said energy director forming a connecting means between said filter hub and said needle accommodating unit with said base and female filter hub fluid passages being in fluid communication with each other, said energy director element forming a shear joint between said female filter hub unit and said needle accommodating unit;

a filter located between said filter hub fluid passage and said needle accommodating unit base fluid passage for filtering fluid passing through the assembly, said filter being supported on said filter hub support shoulder and having an outer peripheral size smaller than the inner peripheral size of said coupling sleeve so that a gap is defined between said filter outer periphery and the inner periphery of said hub; and a rim on said base, said rim including a planar portion which contacts said hub support shoulder in said gap outside said filter outer periphery, said rim further including a beveled portion which slopes upwardly from said planar portion to said needle accommodating unit fluid passage, said beveled portion clamping said filter against said hub support shoulder when said rim planar portion contacts said hub support shoulder in said gap outside said filter outer periphery so that said filter is gently clamped against said hub support shoulder without causing any sudden reduction in filter thickness.

2. The filter hub assembly defined in claim 1 wherein said bevel is approximately an 8° angle.

* * * * *